(12) United States Patent
Snowbarger et al.

(10) Patent No.: US 7,079,021 B2
(45) Date of Patent: Jul. 18, 2006

(54) SYSTEM TO MANUALLY INITIATE AN EMERGENCY SHUTDOWN TEST AND COLLECT DIAGNOSTIC DATA IN A PROCESS CONTROL ENVIRONMENT

(75) Inventors: Jimmie L. Snowbarger, Marshalltown, IA (US); Riyaz M. Ali, Marshalltown, IA (US)

(73) Assignee: Fisher Controls International LLC., St. Louis, MO (US)

( * ) Notice: Subject to any disclaimer, the term of this patent is extended or adjusted under 35 U.S.C. 154(b) by 395 days.

(21) Appl. No.: 10/117,007

(22) Filed: Apr. 5, 2002

(65) Prior Publication Data

US 2002/0145515 A1 Oct. 10, 2002

Related U.S. Application Data

(60) Provisional application No. 60/281,852, filed on Apr. 5, 2001.

(51) Int. Cl.
*G08B 29/00* (2006.01)

(52) U.S. Cl. .................... 340/514; 340/515; 340/516; 340/517; 340/532; 340/574; 137/14; 137/15.08; 702/108; 702/182

(58) Field of Classification Search ............. 340/574, 340/507, 514, 515, 516, 517, 518, 519, 532; 137/14, 15.08, 15.17, 15.24; 702/108, 182
See application file for complete search history.

(56) References Cited

U.S. PATENT DOCUMENTS

| | | | | |
|---|---|---|---|---|
| 3,829,842 A | * | 8/1974 | Langdon et al. | ............. 700/159 |
| 5,109,692 A | | 5/1992 | Fitzgerald | |
| 5,154,314 A | * | 10/1992 | Van Wormer | .................. 222/1 |
| 5,434,774 A | | 7/1995 | Seberger | |
| 5,568,376 A | | 10/1996 | Benmergui et al. | |
| 5,573,032 A | * | 11/1996 | Lenz et al. | .................. 137/486 |
| 5,870,317 A | | 2/1999 | Barnett et al. | |
| 5,970,430 A | | 10/1999 | Burns et al. | |
| 6,026,352 A | * | 2/2000 | Burns et al. | ................. 702/182 |
| 6,119,047 A | | 9/2000 | Eryurek et al. | |
| 6,119,515 A | | 9/2000 | Kemmler et al. | |
| 6,176,247 B1 | * | 1/2001 | Winchcomb | .................. 137/14 |
| 6,186,167 B1 | * | 2/2001 | Grumstrup et al. | ...... 137/487.5 |
| 6,390,114 B1 | * | 5/2002 | Haandrikman et al. | ........ 137/2 |
| 6,466,893 B1 | * | 10/2002 | Iatwesen et al. | ............ 702/179 |

FOREIGN PATENT DOCUMENTS

| | | |
|---|---|---|
| DE | 196 43 297 C1 | 10/1996 |
| JP | 08-193502 | 7/1996 |
| WO | WO- 94/28341 | 12/1994 |
| WO | WO 00/52374 A1 | 9/2000 |

OTHER PUBLICATIONS

International Search Report for Application No. PCT/US02/10790, dated Jul. 16, 2002.

Flanders et al., "Smart ZV's—The Smart Choice For Emergency Isolation Valve Functional Testing," Saudi Aramco Journal of Technology, 1999, pp. 39–44.

\* cited by examiner

*Primary Examiner*—Jeffery Hofsass
*Assistant Examiner*—Daniel Previl
(74) *Attorney, Agent, or Firm*—Marshall, Gerstein & Borun LLP

(57) ABSTRACT

An emergency shutdown test system, wherein the emergency shutdown test system includes an emergency shutdown device controller and sensors to provide data to the controller, the controller having a processor, a memory coupled to the processor and an auxiliary input, wherein an emergency shutdown test is stored in the memory, and the auxiliary input is adapted to receive a binary signal and sensor data. Routines are stored in the memory and are adapted to be executed on the processor to cause the emergency shutdown test to be performed in response to the receipt of the binary signal at the auxiliary input and to cause sensor data to be recorded in the memory during the emergency shutdown test.

28 Claims, 3 Drawing Sheets

SYSTEM TO MANUALLY INITIATE AN EMERGENCY SHUTDOWN TEST AND COLLECT DIAGNOSTIC DATA IN A PROCESS CONTROL ENVIRONMENT

CROSS-REFERENCE TO RELATED APPLICATIONS

This application claims priority to U.S. Provisional Application Ser. No. 60/281,852, entitled "System For Checking Status Of Emergency Shutdown Valve," filed Apr. 5, 2001, the disclosure of which is hereby expressly incorporated herein by reference.

TECHNICAL FIELD

This patent relates to emergency shutdown systems used in process control environments and to the testing and diagnostics of emergency shutdown valves used in such systems.

BACKGROUND

Safety instrument systems incorporate emergency shutdown valves which are normally in a fully opened or fully closed state and controlled by a logic solver or a Programmable Logic Controller (PLC) in an emergency situation. In order to ensure that these valves can properly function, they can be periodically tested by partially opening or closing them. Since these tests are typically performed while the process is on line or operational, it is important to perform any test reliably and then return the valve to its normal state. In this context, the term "normal state" shall refer to the position or state of the emergency shutdown valve when there is no emergency and the emergency shutdown valve is not being tested.

A disadvantage of the prior art systems is that the emergency shutdown tests are typically performed at predetermined intervals by remotely located controllers.

For example, the emergency shutdown tests may be performed only a few times each year, due to cumbersome test procedures and issues related to manpower. Also, during emergency shutdown tests, the emergency shutdown valve, or other emergency shutdown device being tested is not available for use if an actual emergency event were to arise. Limited, periodic testing is not an efficient way of verifying the operability of the emergency shutdown test system. It would thus be advantageous to develop a system where safety personnel could initiate and witness a test at any time.

It is also important that any emergency shutdown system provide the ability to activate an emergency shutdown device (a valve, for example) to its safe condition when commanded by the emergency shutdown controller, in the unlikely, but possible situation where an emergency event has occurred during an emergency shutdown device test interval, where the interval is during a shutdown test. In this context, the term "safe condition" refers to an open or closed position if the emergency shutdown device is an emergency shutdown valve, and the "safe" condition is typically, but not always, the position the valve would end up if all power is removed from the electronic components controlling the emergency shutdown valve. In such a situation, it should be possible for the emergency shutdown system to properly command the emergency shutdown device.

Conventional emergency shutdown tests are initiated by using mechanical jammers, collars, pneumatic test cabinets, process control computers, etc. These sophisticated and costly devices function by sending control signals to emergency shutdown devices, or to devices such as a digital valve controller that could command an emergency shutdown device. The conventional devices also comprise a great deal of hardware and software in bulky equipment that must be present and connected before a test can be initiated. Furthermore, the devices typically perform the same test on each emergency shutdown valve. It would thus be advantageous to eliminate the need for moving and connecting these complicated and expensive devices and to customize the test and data collected for each unique valve. None of the previous emergency shutdown systems are able to fulfill these requirements.

SUMMARY

An emergency shutdown test system adapted to communicate with a diagnostic device having an emergency shutdown device controller is provided. The emergency shutdown device controller includes a processor, a memory coupled to the processor, and an input coupled to the processor and adapted to receive a test activation signal. A first routine is stored in the memory and adapted to be executed on the processor to cause an emergency shutdown test to be performed in response to the receipt of a signal on an auxiliary input. A second routine is stored in the memory and is adapted to be executed on the processor during the emergency shutdown test to cause one or more sensor outputs to be stored in the memory for subsequent retrieval.

The emergency shutdown test system may further include a communication unit, wherein the communication unit is coupled to the processor and communicates with the diagnostic device using an open communication protocol, such as the HART protocol. The first routine stored in the processor's memory may be further adapted to prevent the activation of the emergency shutdown test unless the unit is configured for manual initiation of the test. The first and second routines stored in the processor's memory may be valve specific, configurable scripts.

If the emergency shutdown device is an emergency shutdown valve, the first routine may be further adapted to cause a system generated setpoint to be compared to a valve stem position of the emergency shutdown valve.

The emergency shutdown test system's second routine may be further adapted to cause a plurality of control and sensor data to be monitored, during the emergency shutdown test, and activate alarm conditions if the data is outside of a predetermined range. The system can cause the emergency shutdown test to be aborted if alarm conditions exist. The alarm conditions may be selected from a group of alarm conditions consisting of: minimum partial stroke pressure, travel deviation, and valve stuck. The emergency shutdown device controller may further include an analog-to-digital ("A/D") converter to convert an analog input from a sensor to a digital signal, wherein the A/D converter is operatively connected to the processor. The analog input converted by the A/D converter may include an analog input selected from the group of analog inputs consisting of: valve stem travel, line pressure, loop current, and activation apparatus signal generation. The emergency shutdown test system may also include an explosion proof housing that encloses the emergency shutdown device controller.

DETAILED DESCRIPTION

In a multitude of industries, valves and other mechanical devices are used in process control systems to bring a variety of processes quickly into a safe state if an emergency situation arises. It is thus critically important to test these valves and electro/mechanical devices to ensure that they will function properly. For example, to verify a valve's performance, mechanical movement of the valve needs to be verified in a reliable and secure way without affecting the process.

Figure 1:
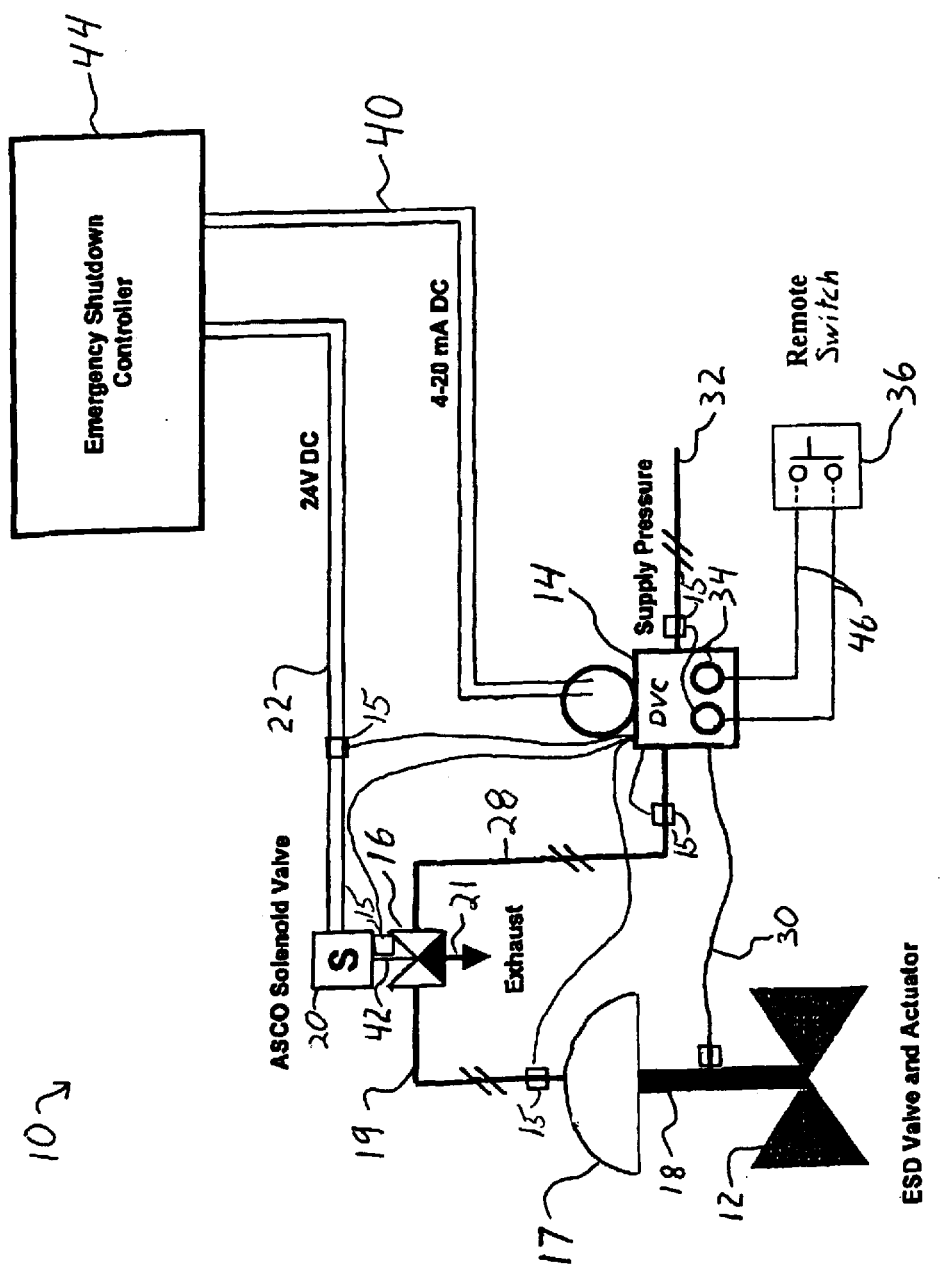
FIG. 1 is a block diagram of several components of an emergency shutdown test system.

FIG. 1 illustrates an example of an emergency shutdown test system 10 for testing an emergency shutdown (ESD) valve 12. It should be appreciated by those skilled in the art that while an emergency shutdown valve is shown in this embodiment, any other control device may be substituted in a control device test system. The emergency shutdown valve 12 may be located, for example, in a process control system including a pipeline supplying fluid at the inlet to the emergency shutdown valve 12 and an outlet pipeline leading fluid from the outlet of the emergency shutdown valve 12.

The emergency shutdown valve 12 is normally in one of two positions, either a wide open state permitting fluid to flow freely between the inlet pipeline and the outlet pipeline, or the emergency shutdown valve 12 is in a fully closed position preventing fluid flow between the inlet pipeline and the outlet pipeline. In order to ensure that the emergency shutdown valve 12 will properly function in a true emergency shutdown condition, the emergency shutdown valve 12 may be periodically tested by partially opening or closing it, which is referred to as partially stroking the valve.

The emergency shutdown test system 10 may include a Digital Valve Controller (DVC) 14 which may initiate a test of the operation of the emergency shutdown valve 12. During an emergency shutdown test, the stem valve 18 is partially moved, and then returned to its normal state. A plurality of sensors 15 are placed on pressure lines and moveable components such that a plurality of parameters can be monitored. The emergency shutdown test may include a plurality of scripts or routines for the DVC 14. A few examples of executable scripts for gathering diagnostic data using sensors are: (1) length of the test stroke (i.e. valve stem travel), (2) rate of travel of the valve stem, (3) data acquired from the sensors during the emergency shutdown test, (4) sampling rate, (5) how long to dwell at the test target position, and (6) actuator pressure and time.

The DVC 14 may also be configured to record the valve 12 behavior during emergency shutdown test conditions. These online valve diagnostics can be configured to start recording automatically when the emergency shutdown valve plug moves. The online valve diagnostics can be marked as an online diagnostic in a data record stored in the DVC 14, and can record any occurrence in which the valve plug moved away from its normal resting position, whether due to a request from the DVC 14 or unexpectedly. The DVC 14 may also be configured so that online diagnostic data collection is triggered when the loop current on the line 40 falls below a predetermined level.

The data acquired from the sensors 15 during the emergency shutdown test is compared to appropriate predetermined limits. Examples of predetermined limits include: minimum pressure, maximum pressure, sample rate, travel time, and travel deviation.

Still referring to FIG. 1, the emergency shutdown test system 10 may include a solenoid valve 16 to supply pressure to move the emergency shutdown valve 12 to both an emergency position in the event an actual emergency exists, and to a partial stroke position (a predetermined position) during an emergency shutdown test. A valve actuator 17 may include a pneumatic input coupled to a pneumatic line 19 to move the emergency shutdown valve's plug (the valve's plug is not shown, but is connected to the valve's valve stem 18) in response to a change in the pneumatic pressure in the pneumatic line 19.

The solenoid valve 16 may include a solenoid control 20 which may receive dc power and electrical control signals on a two wire line 22. For example, the solenoid control 20 may receive 24 volts of direct current over the line 22. The solenoid control 20 may provide an output on an output line 42 that is connected to the solenoid valve 16 to control the pressure at the output of the solenoid valve 16. The solenoid valve 16 and the solenoid control 20 may be used to provide redundancy for the emergency shutdown test system 10. The redundancy is achieved by allowing the solenoid valve 16 to open and exhaust the air pressure in the line 19 out an exhaust line 21, thus causing a spring on the actuator 17 to move the valve stem 18. In other words, an alternate route in the form of the exhaust line 21 is provided for reducing the air pressure in the line 19. Sensor data from the line 19 is compared to the valve stem travel data to determine if a valve stuck alarm should be activated.

The DVC 14 may be operatively connected to the emergency shutdown valve 12 and may include a pneumatic output line 28 coupled to the solenoid valve 16. The DVC 14 may be powered by a pair of electrical lines 40 and communicate over a HART network (a communication protocol well known to those skilled in the art), or any other acceptable protocol.

In FIG. 1, the pair of electrical lines 40 connects the DVC 14 to an emergency shutdown controller 44. A target plug position may be sent to the DVC 14 via a current signal on the pair of electrical lines 40, a digital setpoint from a control device using the HART protocol, or any other preconfigured default setpoint. The target plug position may be estimated by measuring the output pressure on line 28 which should be directly proportional to the position of the emergency shutdown valve's valve stem. The DVC 14 may cause air pressure to move the valve actuator 17 and use a position sensor 15 to measure the actual valve plug position of the emergency shutdown valve 12. The DVC 14 may continuously adjust the actuator output air pressure on line 28 to move the position of the valve plug to the desired target position after the DVC 14 receives a change in loop current, or a digital command via the communications protocol.

The DVC 14 may include sensor inputs and auxiliary inputs. Auxiliary inputs can be connected to an external remote activation apparatus, such as, for example, a push button 36, via lines 46. In embodiments where the auxiliary input includes a connector, a voltage may be present at a first auxiliary input, and the push button 36 may electrically connect the first auxiliary input to a second auxiliary input. Those skilled in the art will appreciate that a single connection may alternatively be used in place of the set of auxiliary inputs 34, wherein the push button 36 may electrically ground a single auxiliary input. The remote switch 36 may be an inexpensive electrical switch for initiating a partial stroke test of the emergency shutdown valve 12. Furthermore, the push button 36 may be located remote from the DVC 14 in any remote location that provides convenient access for a safety officer. An employee can press the remote switch 36 and witness the valve stroke and return to the normal state.

Figure 2:
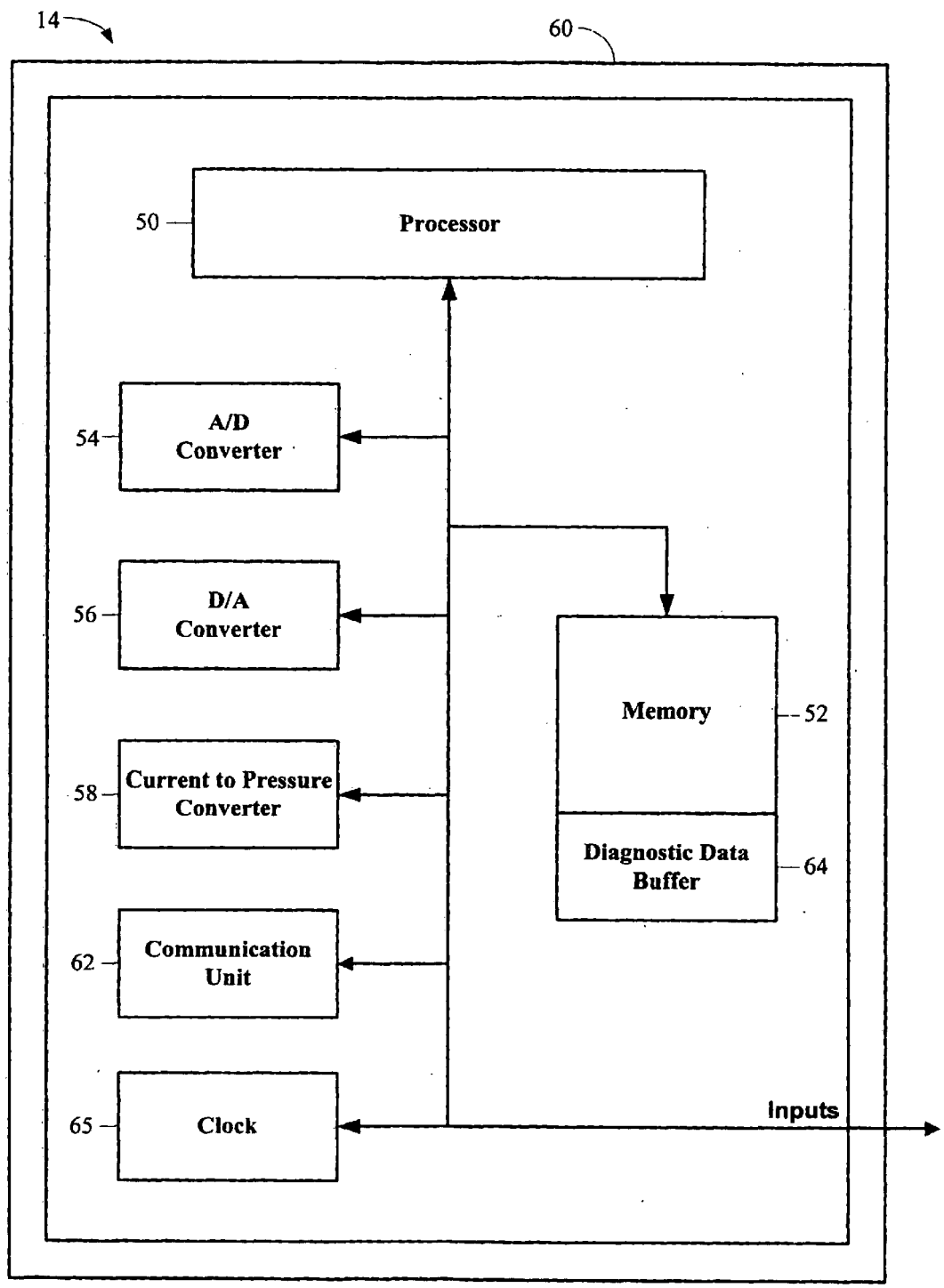
FIG. 2 is a block diagram of several components of a digital valve controller.

In general, the DVC 14 is a processor based emergency shutdown valve controller. The embodiment of FIG. 2 includes some of the same structures and components as previously shown in FIG. 1. For clarity, the structures and components remaining the same are shown with like reference numbers as those in FIG. 1. As illustrated in FIG. 2, the DVC 14 includes a processor 50, sensors 15, a memory 52, an analog-to-digital (A/D) converter 54, a digital to analog (D/A) converter 56, and a current to pressure converter 58. The memory 52 is utilized to store instructions or scripts and diagnostic data. The A/D converter 54 converts analog sensor inputs into digital signals for the processor 50 to process or store. Examples of sensor inputs acquired and stored by the DVC 14 include: valve stem travel (or valve plug travel), output line pressure, loop current, etc. The processor 50 monitors the auxiliary inputs such as the input for the electrical switch 36. The D/A converter 56 may convert a plurality of digital outputs from the processor 50 into analog signals such that the current to pressure converter 58 can provide a pressure based on digital data to drive the emergency shutdown valve actuator 17.

The DVC 14 may be enclosed within a housing, such as an explosion proof housing 60 of FIG. 2. The housing 60 may be used to prevent sparks from reaching explosive gasses in a plant, and thus reduce the likelihood that the emergency shutdown system 10 will cause an explosion. Locating the electrical switch 36 outside the housing 60 allows activation of an emergency shutdown test on an emergency shutdown device without setup or disassembly of the housing 60. In hazardous environments, the electrical switch 36 may be explosion proof, so that it does not create a spark when activated by a user.

During an active test of the emergency shutdown system 10, the solenoid valve 16 is maintained in a stand-by position to provide fluid flow between the pneumatic lines 19 and 28. The DVC 14 may receive a pressure supply from a supply line 32 and gather data from a valve stem sensor 15 to determine a valve stem position through the travel feedback linkage 30. The valve stem position is indicative of the valve plug position because they are connected. Furthermore, the DVC 14 may compare a predetermined valve plug setpoint that is stored in the memory 52 of the DVC 14, to the actual valve stem position, to verify the desired emergency shutdown valve plug position during normal operation. For example, low pressure on the line 19 would let the valve plug partially close, possibly creating problems in the process.

When it is desired to manually initiate a partial stroke test on the emergency shutdown valve 12 and witness the test, a user may activate the electrical switch 36 to generate a signal, which is detected at the auxiliary input 34, wherein the DVC 14 controls the pressure supplied by the pneumatic line 28 and conveyed to the valve actuator 17, and the valve stem is moved from the normal 100 percent open (or closed) position (i.e. the normal state) to a partially closed (or partially opened) test position and then back again to the normal state.

Emergency shutdown test systems utilizing auxiliary switches that are operably connected to DVCs are much less expensive, more convenient and quicker. If there is a valve that looks suspicious or that was recently rebuilt, a simple switch activation can reveal the operability of the valve. Emergency shutdown test systems utilizing auxiliary switches also have the ability to perform customized tests for each emergency shutdown valve or group of valves. This customization may be accomplished by one or more configurable scripts (i.e. computer programs or routines) stored in the memory 52 and retrievable by the processor 50.

Additional tests may be conducted based on the diagnostic data collected. The sensor or diagnostic data collected during the emergency shutdown test may be retrieved using a handheld computing device through a communication unit 62 in the DVC 14, or the data may be sent back to the main control room. Furthermore, systems such as the emergency shutdown system 10 provide the capability of scheduling predictive maintenance based on the results of the partial stroke test.

Figure 3:
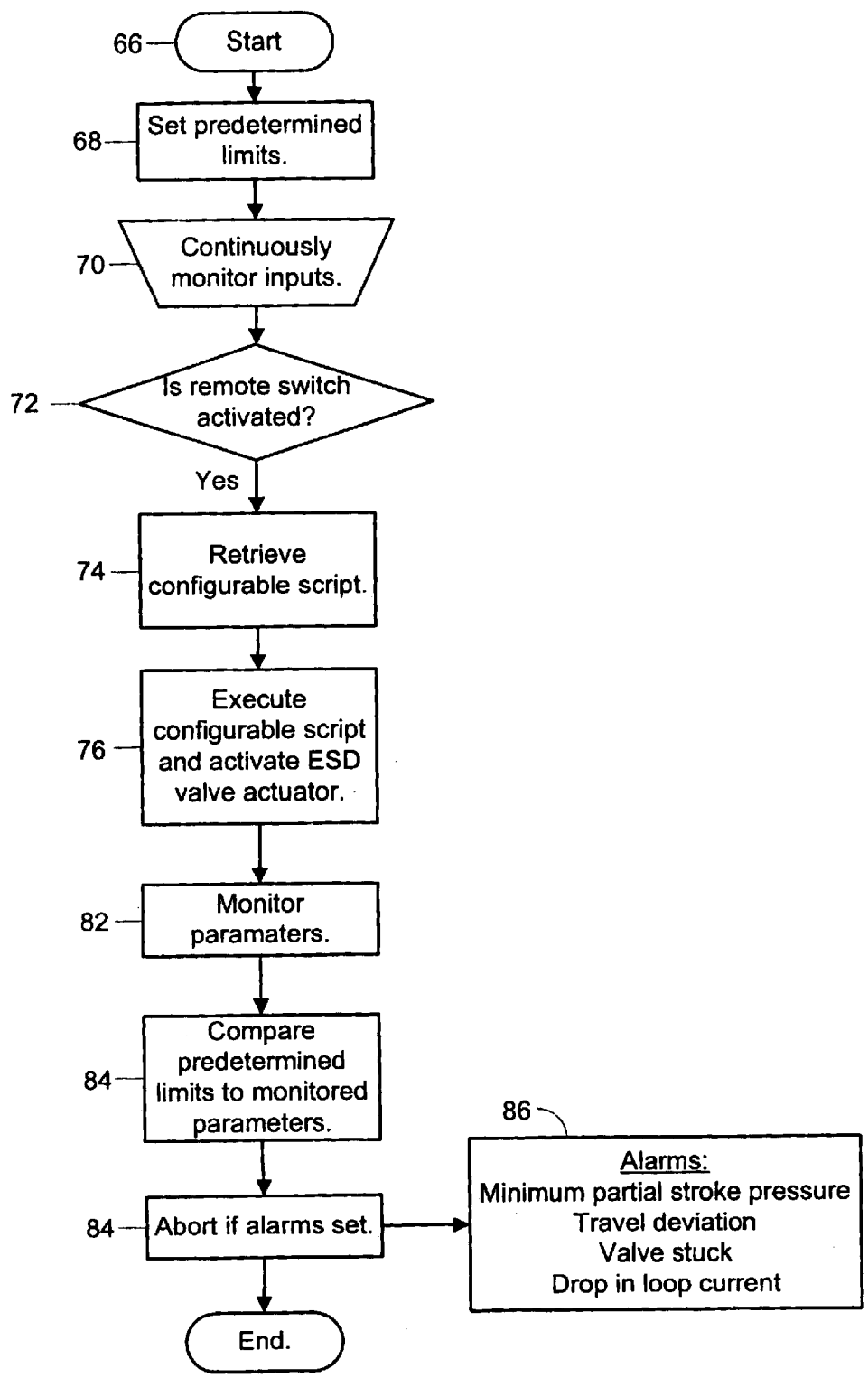
FIG. 3 is a flowchart representation of some of the steps used in activation and diagnostics of an emergency shutdown test.

FIG. 3 illustrates some of the steps for performing a remotely activated partial stroke ESD test. The process begins at a block 66 and proceeds to a block 68 where one or more predetermined limits are stored in a memory. A processor may continuously monitor an auxiliary input, as shown at a block 70, and sense if a signal from a remote switch has been received on the auxiliary input, as shown at a block 72. The processor may continue monitoring the auxiliary input at all times, even during the performance of an emergency shutdown test. Illustrated at a block 74, the processor may retrieve a configurable script or routine unique to the emergency shutdown valve, for access by the processor. The processor may read and execute the script, as shown at a block 76. It will be appreciated by those skilled in the art that the scripts may be identified as an emergency shutdown partial stroke script by using a data byte encoded in a script record. Execution of the script by the processor may include activating the emergency shutdown valve actuator to move the valve stem and connected valve plug, by a predetermined amount (travel to target) and for a predetermined duration (time at target), at a predetermined velocity (time to target), as defined by the script. A clock 65, as shown in FIG. 2, is operably connected to the processor 50 and provides a reference for all activities.

While initiating and conducting the emergency shutdown test, the processor may monitor the sensor inputs, such as line pressures, solenoid position, and control data, as shown at a block 82. The processor may compare the data received at the monitored sensor inputs to predetermined limits, as shown at a block 84. As illustrated at a block 84, if the received data is outside of the predetermined limits, an alarm is set. Furthermore, some alarms may cause the processor to abort the emergency shutdown test and terminate processing of the script. Conditions for termination and corresponding alarm initiation may be user configured and utilize multiple alarms, for example, minimum output pressure (pressure supplied to the valve) and travel deviation. A Valve Stuck alarm may be generated as a result of data provided by sensors that indicates that the valve is not responding appropriately to a command. The conditions for alarms are described in greater detail immediately below.

A first example of a possible alarm is shown at a block 86, which includes a Minimum Partial Stroke Pressure alarm. As illustrated in a block 84, a partial stroke test could be aborted if the output pressure on line 28 falls below a predetermined level for a predetermined amount of time. During a partial stroke test, the output pressure on line 28 is monitored by sensor 15 to detect a pressure drop below a predetermined level. Another possible alarm shown in the block 86 includes, for example, a Travel Deviation alarm, wherein the actual travel of the emergency shutdown valve's valve stem is measured by travel sensor 15 and compared to the expected travel. The DVC's processor 50 controls the output pressure on the line 28 to determine if the two values (measured travel (position) and expected travel (pressure)) match. The match between the measured travel and expected travel need not be a perfect match, but may be a proportional match. Yet another alarm could include a Valve Stuck alarm which is set when the travel distance measured by the valve stem sensor deviates from the expected travel in excess of a predetermined distance as compared to the control pressure on the actuator 17.

When conducting a partial stroke, the DVC's processor 50 causes the actuator 17 to move the valve stem of the emergency shutdown valve 12 through a pre-configured stroke profile, and back to the emergency shutdown valve's original position. During this procedure, the DVC 14 may collect and record sensor data and perform diagnostics, as shown at a block 82 of FIG. 3. The partial stroke procedure is useful in locating faulty valves and increasing the reliability of an ESD system. In one embodiment, during the partial stroke test, the DVC's processor 50 generates a ramp signal which is mathematically added to the valve setpoint dictated by a control signal on the line 40, to cause movement of the valve plug to a target, and back again to the valve's normal position. The partial stroke procedure allows changes in the control signal to control the emergency shutdown valve 12 while the emergency shutdown test is in progress as well as allowing the emergency shutdown valve 12 to be stroked from its normal position, to any other position, and back to the normal position for purposes of stroke testing.

As previously described, the DVC's processor 50 is used to control the valve plugs movement by generating a ramp number and adding that ramp number to a second value that a user sends to the DVC 14 indicative of a position where the user wants the valve plug to be, the sum of which equals a target of the plug position that the controller attempts to maintain. This technique of moving the valve plug allows the user to specify the ramp rate and target for each step in the process of testing the valve 12, plus the sensor data to be collected (i.e. pressure, travel, requested target control signals, voltages, current to pressure drive current, timing, etc.) to be collected and the sampling rate for each sensor.

A script for an emergency shutdown test may be configured so that an active setpoint (whether from the loop current or a HART signal) continues to be active, and the DVC's processor 50 generates a ramp signal that it is summed with the active setpoint, to produce a resulting travel to a target position. This technique allows the loop current to override the script-generated movements in case of an actual emergency shutdown during testing. An abort command (i.e., a special message via HART or a second binary signal received by the auxiliary input at any time during the test may abort the test and immediately withdraw any setpoint bias generated by the script for test purposes.

As previously mentioned, a user may initiate an emergency shutdown test by activating an external push button which provides a binary signal (on or off). To avoid inadvertent activation, the processor 50 may check at the contacts for a binary signal having a predetermined length of time before initiating the emergency shutdown test. For example, closing the auxiliary contacts for more than three seconds, but less than five seconds, could activate the emergency shutdown test. For example, a routine stored in the memory 52 could cause the emergency shutdown test to be performed when the binary signal is received at the input for a time duration greater than a first threshold and less than a second threshold. Referring back to the embodiment of FIG. 1, the DVC may be configured so that opening the contacts after they have been closed for more than a predetermined time, such as five seconds, however, has no effect on the system 10. As a precaution, the DVC may be configured to prevent a test from activating if, for example: (1) commanded valve diagnostics are active, (2) no valid diagnostic script has been stored in the memory of the digital valve controller, (3) a script file is open for writing, or (4) there is a firmware download in progress. It will be appreciated by those skilled in the art that the DVC 14 may be configured so that any number of additional events may also prevent a test from being conducted.

As an additional precaution, the emergency shutdown test system 10 can be configured so that a script cannot be written to a DVC while another script is executing. Similarly, the emergency shutdown test system 10 could be configured to prevent an emergency shutdown partial stroke script from being initiated by a user activating the push button, unless the DVC is set to accept an auxiliary input, and an emergency shutdown partial stroke script is stored in the memory 52.

If the emergency shutdown valve 12 is connected to the main process controller, the emergency shutdown test system 10 may be configured so that a signal sent using a control language will activate an ESD test script only if the script is an emergency shutdown partial stroke format. The emergency shutdown partial stroke test may function in a mode that is independent of a HART signal, so that the valve's last position is maintained independent of the signal. When an emergency shutdown partial stroke is in progress, a HART command to execute a diagnostic may be rejected by the DVC's processor 50 with a "busy" signal, and an auxiliary current-to-pressure signal may result in aborting the emergency shutdown test (or prevent the emergency shutdown test from starting).

An emergency shutdown test can be manually aborted by a signal at the auxiliary input for a predetermined amount of time, for example, activating the switch for one second. The occurrence of several events, such as when the output pressure on the line 28 falls below the configured minimum partial stroke pressure for a predetermined amount of time may automatically abort an emergency shutdown test, depending on the configuration of the DVC. Other events that may cause the test to automatically abort include when the travel deviation alarm becomes set or if an emergency shutdown instrument is taken out of service via a command signal sent using the HART protocol. Also, a stop diagnostics command from a dominant HART master would cause the emergency shutdown test to abort.

When a partial stroke test is being performed, the valve's target (movement to the desired position) is dictated by summing a present Implied Valve Position (IVP) with a ramped bias, wherein the ramped bias may be initialized to zero at the time the stroke is initiated. If the ESD control signal is providing a valve setpoint, the ESD control signal may continue to control a base IVP being used in the servo setpoint calculation, thus allowing the ESD control signal to effectively override a stroke diagnostic in emergency conditions. Furthermore, the setpoint bias produced by the test control may be forced to zero if the ESD control signal is less than a predetermined limit. Forcing the setpoint bias to zero may prevent an errant script from affecting an emergency shutdown. To allow immediate shutdown, the DVC's processor 50 may disregard the ramp rate used in the test and use only the value sent via the ESD control signal. The emergency shutdown test system 10 may include cutoffs that are modified so that a high loop current cutoff can be a pressure controlled cutoff, but the low loop current cutoff will be overridden by any configured rate limits, but finally reduce the current-to-pressure drive to zero.

The DVC 14 monitors a plurality of inputs, such as, for example, output pressure on the line 28, valve plug position, minimum partial stroke pressure on the line 19, and maximum travel deviation, from sensors 15 that are operably connected to the DVC 26 for detecting a malfunctioning valve during an emergency shutdown test. A stuck valve plug may be detected when the valve plug fails to move as commanded, wherein the DVC 14 sets an alarm and alerts the user of the stuck valve plug. The DVC 14 could use an existing deviation alert which can be configured for a deviation amount (travel distance) and time, in conjunction with the existing Alert Event Record. Any computer system, such as a handheld computer can be used to access the Alert Event Record by connecting the computer system to the communication unit of the DVC 14. If the Deviation Alert is activated during the test, the test could be terminated and a "Valve Stuck" marker (status bit) placed in the data file. Additionally, the Valve Stuck marker may be set and a record written to the Alert Event Record indicating a deviation alert.

If the output pressure of the DVC 14 on the line 28 falls below the configured Minimum Partial Stroke Pressure for the predetermined amount of time, the test may be aborted, a Valve Stuck marker placed in a diagnostic data file, and the Valve Stuck alarm bit may be set. The alarm bit could remain set until the DVC's power is cycled, the next partial stroke is activated, or the data (the Valve Stuck marker) is read by a user. Diagnostic data may be collected in a diagnostic data buffer 64, as shown in FIG. 2.

The emergency shutdown test system 10 may further be configured to incorporate a continual pneumatic self-test. The pneumatic self test may continuously check the components of the DVC 14 by keeping the DVC 14 in a pressure control mode. The continuous pneumatic self test function may constantly analyze one or more pneumatic stages comparing sensor data to control commands, such as current-to-pressure data, to assure that the DVC 14 will be able to accurately control the emergency shutdown valve 12 when necessary.

To assure pneumatic integrity, the emergency shutdown test system 10 may include a test for a pressure deviation alarm in the diagnostics. The pressure deviation alarm is set when a pressure controlled cutoff is active, and has passed through its "saturation" phase. The saturation phase is the phase when the DVC 14 causes the maximum amount of pressure to be applied to the actuator 17 and maintains that pressure for a predetermined amount of time to allow the pressure to stabilize, before reducing the pressure to a 'normal' target pressure, which is less than saturation, but sufficient to maintain the valve plug in the normal position. This pressure is the "target" pressure used in the pneumatic self test, and the ability to maintain the actual pressure at this target value determines the success of the pneumatic self test. To implement the pressure deviation alarm, the DVC's memory 52 may store a predetermined limit and determine the difference between the actual and expected pressures and set a pressure deviation alert if a condition occurs. A time of occurrence (i.e. the actual time and date) for a pressure deviation alert may be recorded by the DVC's processor 50 using the clock 65. The clock 65 may also record the pressure deviation alert time, which is the maximum amount of time (usually in seconds) the actual output pressure is allowed to differ from the expected pressure by a value that is greater than the pressure deviation alert trip point.

The DVC's processor 50 may set the pressure deviation alarm status bit when the pressure on the output line 28 deviates from the expected pressure by an amount exceeding the pressure deviation alert trip point, for a predetermined amount of time. Logic for the pressure deviation alarm may be patterned after the travel deviation alarm. However, the count down for release of the pressure deviation alarm for the predetermined amount of time may be done at half the rate of the count up for setting the pressure deviation alarm. Reducing the count down for release of the pressure deviation alarm causes the alert to persist for approximately ten seconds after the deviation clears, but the pressure deviation alarm may be designed so that symmetric oscillations of the pressure signal, such as would occur due to loss of feedback quality, will cause the alert to be set.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An emergency shutdown test system adapted to communicate with a portable handheld computing device, the test system comprising:
    an emergency shutdown device controller having:
        a processor;
        a memory coupled to the processor, wherein an emergency shutdown test procedure is stored in the memory;
        an auxiliary input coupled to the processor and adapted to receive a binary signal from a switch, wherein the switch is accessible to a user and coupled directly to the auxiliary input;
        a first routine stored in the memory and adapted to be executed on the processor to cause the emergency shutdown test procedure to be performed in response to the receipt of the binary signal at the auxiliary input; and
        a second routine stored in the memory and adapted to be executed on the processor to acquire data from a sensor and to cause the data to be stored in the memory, during the emergency shutdown test.

2. The emergency shutdown test system of claim 1, further including a communication unit, wherein the communication unit is coupled to the processor and communicates with the portable hsndheld computing device.

3. The emergency shutdown test system of claim 1, wherein the first routine is further adapted to prevent the activation of the emergency shutdown test unless an auxiliary-input-type is activated.

4. The emergency shutdown test system of claim 1, wherein the first and second routines comprise valve specific, configurable scripts.

5. The emergency shutdown test system of claim 1, further including an emergency shutdown valve.

6. The emergency shutdown test system of claim 5, wherein the second routine is further adapted to cause a valve plug setpoint to be compared to an actual valve stem position of the emergency shutdown valve.

7. The emergency shutdown test system of claim 5, wherein the emergency shutdown test procedure includes a partial stroke test for the emergency shutdown valve.

8. The emergency shutdown test system of claim 5, wherein the second routine stored in the memory is further adapted to automatically cause the processor to acquire data from a sensor when a valve plug of the valve moves.

9. The emergency shutdown test system of claim 5, wherein the emergency shutdown device controller further includes an analog-to-digital ("A/D") converter to convert an analog input from a sensor to digital data for utilization by the processor.

10. The emergency shutdown test system of claim 9, wherein the analog input converted by the A/D converter includes an analog input selected from the group of analog inputs consisting of: valve stem travel, line pressure, loop current, and binary signal generation.

11. The emergency shutdown test system of claim 1, wherein the second routine is further adapted to cause a plurality of inputs that are coupled to the processor to be monitored, during the emergency shutdown test procedure, for one of several conditions that would cause the emergency shutdown test to be aborted.

12. The emergency shutdown test system of claim 11, wherein the data acquired from the sensor is compared with a predetermined limit.

13. The emergency shutdown test system of claim 11, wherein the conditions are selected from a group of conditions consisting of: minimum partial stroke pressure, travel deviation, and valve stuck.

14. A control device test system adapted to communicate with a portable handheld computing device, the test system comprising:
    a device controller having:
        a processor;
        a memory coupled to the processor, wherein a control device test is stored in the memory;
        an auxiliary input coupled to the processor and adapted to receive a binary signal from a switch;
        a first routine stored in the memory and adapted to be executed on the processor to cause the control device test to be performed in response to the receipt of the binary signal from the switch at the auxiliary input; and
        a second routine stored in the memory and adapted to be executed on the processor to cause data to be acquired from a sensor and recorded in the memory during the control device test;
        a communication unit, coupled to the processor, to transfer the data to a user; and
        a third routine stored in the memory and adapted to be executed on the processor to cause the control device test to be performed in response to the receipt of a digital signal from the portable handheld computing device at the communication unit.

15. The control device test system of claim 14, wherein the first routine is further adapted to cause the auxiliary input to be monitored for a binary signal having a predetermined time duration.

16. The control device test system of claim 14, wherein the first, second and third routines comprise valve specific, configurable scripts.

17. The control device test system of claim 14, further including an emergency shutdown valve.

18. The control device test system of claim 17, wherein the second routine is further adapted to compare a predetermined limit to a valve stem position of the emergency shutdown valve, and create an alarm if the comparison is greater than a predetermined threshold.

19. The control device test system of claim 14, wherein the second routine is further adapted to monitor a plurality of sensor inputs during the control device test, and to acquire and compare data from the sensor inputs to a plurality of predetermined limits, and to indicate an alarm condition, and if appropriate, to cause the control device test to be aborted.

20. The control device test system of claim 14, wherein the device controller further includes an analog-to-digital ("A/D") converter to convert an analog input signal from a sensor to a digital value for usage by the processor.

21. The control device test system of claim 20, wherein the analog input measured by the A/D converter includes an analog input selected from a group of sensor inputs consisting of: valve stem travel, line pressure, and loop current.

22. A method of conducting an emergency shutdown test on an emergency shutdown valve, comprising:
    storing an emergency shutdown test script in a memory of a controller,
    monitoring an input coupled to the controller for the receipt of a binary signal received from a test initiation switch that is accessible to a user;
    monitoring the input for the receipt of a digital signal received from the portable handheld computing device;
    activating the test script in response to at least one of the binary signal received from the test initiation switch, or the digital signal that is received from the portable handheld computing device;
    storing at least one predetermined limit in the memory of the controller;
    activating the test initiation switch to perform the emergency shutdown test, wherein a processor is responsive to the switch activation;
    acquiring sensor data from a sensor and storing the sensor data in the memory; and
    comparing the sensor data to the at least one predetermined limit and creating alarms if the difference between the sensor data and the at least one predetermined limit is greater than a predetermined threshold.

23. The method of claim 22, further comprising aborting the emergency shutdown test if an alarm is created.

24. The method of claim 22, further comprising transferring the sensor data to a portable handheld computing device.

25. The method of claim 22, wherein the step of comparing the sensor data includes comparing a valve plug setpoint to an actual valve stem position.

26. The method of claim 22, wherein the step of storing the emergency shutdown test script includes storing a partial stroke test for the emergency shutdown valve.

27. The method of claim 22, further comprising converting an analog input from a sensor to digital data for utilization by a processor of the controller.

28. The method of claim 22, further comprising causing a plurality of inputs that are coupled to a processor of the controller to be monitored for one of several conditions that would cause the emergency shutdown test to be aborted.

* * * * *

UNITED STATES PATENT AND TRADEMARK OFFICE
CERTIFICATE OF CORRECTION

PATENT NO. : 7,079,021 B2
APPLICATION NO. : 10/117007
DATED : July 18, 2006
INVENTOR(S) : Jimmie L. Snowbarger et al.

It is certified that error appears in the above-identified patent and that said Letters Patent is hereby corrected as shown below:

On the Title Page:

At line (73), "LLC." should be -- LLC --.

At line (56), U.S. Patent Documents, please add -- 4,428,223, 1/1984, Trevisan --.

At line (56), U.S. Patent Documents, please add -- B1 4,428,223, 7/1989, Trevisan --.

At line (56), U.S. Patent Documents, please add -- 4,557,136, 12/1985, Greenhalf --.

At line (56), U.S. Patent Documents, please add -- 5,000,040, 3/1991, Charbonneau et al. --.

At line (56), U.S. Patent Documents, please add -- 5,425,270, 6/1995, McDonald et al. --.

At line (56), U.S. Patent Documents, please add -- 5,469,737, 11/1995, Smith et al. --.

In the Drawings:

At sheet 3, Fig. 3, block 82, "parameters" should be -- paramaters --.

UNITED STATES PATENT AND TRADEMARK OFFICE
CERTIFICATE OF CORRECTION

PATENT NO. : 7,079,021 B2
APPLICATION NO. : 10/117007
DATED : July 18, 2006
INVENTOR(S) : Jimmie L. Snowbarger et al.

It is certified that error appears in the above-identified patent and that said Letters Patent is hereby corrected as shown below:

In the Claims:

At Column 10, line 33, "signal at" should be -- signal received from the switch at --.

At Column 10, line 42, "hsndheld" should be -- handheld --.

Signed and Sealed this

Fifteenth Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 7,079,021 B2  
APPLICATION NO. : 10/117007  
DATED : July 18, 2006  
INVENTOR(S) : Snowbarger et al.

Page 1 of 1

It is certified that error appears in the above-identified patent and that said Letters Patent is hereby corrected as shown below:

On the Title Page:

Item (75), "Inventors: Jimmie L. Snowbarger, Marshalltown, IA (US); Riyaz M. Ali, Marshalltown, IA (US)" should be -- Inventors: Jimmie L. Snowbarger, Marshalltown, IA (US); Riyaz M. Ali, Marshalltown, IA (US); Patrick S. Flanders, Dhahran, Saudi Arabia (US) --.

Item (73), "Assignee: Fisher Controls International LLC, St. Louis, MO (US)" should be -- Assignees: Fisher Controls International LLC, St Louis, MO (US); Saudi Arabian Oil Company, Dhahran, Saudi Arabia (Saudi Arabia) --.

Signed and Sealed this  
Twenty-fifth Day of January, 2011

David J. Kappos  
*Director of the United States Patent and Trademark Office*